(12) United States Patent
Tao et al.

(10) Patent No.: US 8,948,743 B2
(45) Date of Patent: *Feb. 3, 2015

(54) METHOD AND SYSTEM FOR IMPLEMENTING LOCAL CALL LOCAL SWITCH

(75) Inventors: Quanjun Tao, Shenzhen (CN); Zhenhua Xie, Shenzhen (CN); Jing Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 546 days.
This patent is subject to a terminal disclaimer.

(21) Appl. No.: 13/390,216

(22) PCT Filed: Dec. 25, 2009

(86) PCT No.: PCT/CN2009/076086
§ 371 (c)(1),
(2), (4) Date: Feb. 13, 2012

(87) PCT Pub. No.: WO2011/017893
PCT Pub. Date: Feb. 17, 2011

(65) Prior Publication Data
US 2012/0142338 A1      Jun. 7, 2012

(30) Foreign Application Priority Data

Aug. 12, 2009   (CN) .......................... 2009 1 0167321

(51) Int. Cl.
| | |
|---|---|
| *H04B 1/10* | (2006.01) |
| *H04W 76/02* | (2009.01) |
| *H04Q 3/00* | (2006.01) |
| *H04W 28/06* | (2009.01) |
| *H04W 92/04* | (2009.01) |
| *H04W 92/22* | (2009.01) |

(52) U.S. Cl.
CPC ........... *H04W 76/022* (2013.01); *H04Q 3/0016* (2013.01); *H04W 28/06* (2013.01); *H04W 92/045* (2013.01); *H04W 92/22* (2013.01)
USPC ........... 455/424; 455/445; 455/436; 455/440; 455/438; 455/443; 455/437; 455/448

(58) Field of Classification Search
CPC ..... H04W 88/14; H04W 28/20; H04W 28/24; H04W 72/04; H04W 36/0005; H04W 40/00; H04W 40/20; H04W 64/00; H04W 76/02; H04W 76/021; H04W 76/04; H04W 80/00; H04W 88/02; H04W 88/16; H04W 8/082; H04L 12/4633; H04L 43/0811; H04L 43/0876; H04L 12/46; H04L 41/0823; H04L 47/14; H04L 47/70; H04L 47/767; H04L 65/1069; H04M 2203/1008; H04M 2240/30; H04M 2215/7435; H04M 15/8033
USPC ......... 455/424, 436, 440, 438, 442, 443, 437, 455/448
See application file for complete search history.

(56) References Cited

FOREIGN PATENT DOCUMENTS

| | | |
|---|---|---|
| CN | 101035369 A | 9/2007 |
| CN | 101159905 A | 4/2008 |
| CN | 101383985 A | 3/2009 |

OTHER PUBLICATIONS

The State Intellectual Property Office, The P.R. China; International Search Report; Mailed May 20, 2010.

*Primary Examiner* — Nimesh Patel
(74) *Attorney, Agent, or Firm* — Design IP

(57) ABSTRACT

A method for implementing local call local switch (LCLS) is provided in the present invention, and the method includes that: a mobile switching center (MSC) at a calling side receives a call establishment request of a calling user, and a MSC at a calling side transmits the local reference to a base station system (BSS) at the calling side and a MSC at the called side; the MSC at the called side transmits the received local reference to the BSS at the called side; and a BSS judges whether the local switch can be triggered according to the received local reference, and executes the local switch when determining that the local switch can be triggered. The present invention also provides a system for implementing LCLS. With the method and system provided by the present invention, the problem of unsuccessful local switch resulted by the BSS connecting multiple MSCs is solved.

23 Claims, 8 Drawing Sheets

METHOD AND SYSTEM FOR IMPLEMENTING LOCAL CALL LOCAL SWITCH

CROSS REFERENCE TO RELATED APPLICATIONS

The present application is a U.S. National Stage Application of PCT Application Serial No. PCT/CN2009/076086, filed on Dec. 25, 2009, which claims priority from Chinese Patent Application Serial No. CN 200910167321.X, filed on Aug. 12, 2009, both of which are incorporated by reference in their entireties.

TECHNICAL FIELD

The present invention relates to the field of communication, and in particular to, a method and a system for implementing local call local switch in a circuit switched domain.

BACKGROUND OF THE RELATED ART

The mobile network, such as the global system for mobile communications (GSM) and the universal mobile telecommunications system (UMTS), etc., uses the circuit switch technology called as the circuit switched (CS) domain, which can provide the basic voice service for the users and the supplementary service based on the voice service.

In some places in the world, such as Africa, South America and South Asia, etc., there is a lack of fast and reliable transmission resources or high transmission cost exists, which brings certain difficulties to the network and service deployment for the operator. However, it can be obtained according to the statistical data that most of the calls in the mobile network are local calls in those places and these calls are generated in the same base station system (BSS). For the local calls, if the local switch technology (the voice data is looped in the BSS) is used, then the transmission resource of the A interface between the BSS and the mobile switch center (MSC) of the core network can be saved.

FIG. 1 is a schematic diagram of a traditional voice call. The user equipment (UE) accesses the BSS and the MSC through the CS domain. When the UE1 calls the UE2, the UE1 sends a call establishment request to its accessed MSC through the BSS; the MSC finds out the called UE2 according to the accessed location information of the UE2, and notifies the BSS to establish the radio bearer connecting to UE1 and UE2 and establish the bearers of the UE1 and UE2 between the BSS with the MSC respectively; the bearers at both sides of the MSC are looped, which ensures the voice communication between UE1 and UE2.

FIG. 2 is a schematic diagram of a voice call using local call local switch technology. Compared with FIG. 1, when receiving the call establishment request of the UE1, the MSC judges whether the UE1 and the UE2 belong to the same BSS according to a cell, and if the UE1 and the UE2 belong to the same BSS, then the MSC notifies the BSS to execute the local switch; the bearer loops of the UE1 and the UE2 are executed at the BSS side, which saves the bearer resources, namely the bearer resource of the A interface, between the BSS and the MSC.

FIG. 3 is a flow chart of signaling using local call local switch technology of FIG. 2, which comprises the following steps:

301, the UE1 and the UE2 initiate a call in the same BSS and establish the interconnection through the MSC of the core network, and the MSC allocates the circuit numbers or the call identifiers between the BSS and the MSC to the calling UE1 and the called UE2;

302, the called UE2 replies in the ringing state and sends the called reply message through the BSS to the MSC;

303, the MSC sends the called reply message to the calling UE1 to notify the UE 1 that the call is connected;

304, the MSC judges whether this call is a local call which belongs to the same BSS according to the current location information of the calling UE1 and the called UE2;

305, if the call is a local call which belongs to the same BSS, then the MSC sends the local switch command message including the circuit numbers or the call identifiers between the BSS and the MSC allocated to the calling UE1 and the called UE2 by the MSC to the BSS to notify the BSS to execute the local switch;

306, the BSS receives the local switch command message and associates the two ongoing communication sessions according to the circuit numbers or the call identifiers of the calling UE1 and called UE2 in the local switch command message, and their voice data bearers are looped to implement the switch of the voice bearers in the BSS;

307, the BSS sends the local switch success message to the MSC after the local switch succeeding; and 308, the MSC, after receiving the local switch success message, notifies BSS to release the voice bearer connection between the BSS and the MSC, that is, release the bearer connection of the A interface.

With regard to the analysis in the above steps, if it is in a scenario that the BSS connecting multiple MSCs, as shown in FIG. 4, the calling UE1 accesses the MSC 1 through the BSS and the called UE2 accesses the MSC 2 through the BSS, although the calling UE1 and the called UE2 initiate the call in the same BSS, the calling UE1 and the called UE2 access the different MSCs respectively, thereby causing that neither MSC1 accessed by the calling UE1 nor the MSC2 accessed by the called UE2 can judge whether this call is a local call according to the location information of the calling UE1 and the called UE2 in step 304, and finally causing the problem that the local call cannot execute the local switch.

SUMMARY OF THE INVENTION

The object of the present invention is to provide a method and a system for implementing local call local switch, which solves the problem of unsuccessful local switch caused by the BSS connecting multiple MSCs.

The present invention provides a method for implementing local call local switch, and the method comprises:

a mobile switching center (MSC) at a calling side receiving a call establishment request of a calling user, and the MSC at the calling side transmitting a local reference of an associated call to a base station system (BSS) at the calling side and a MSC at a called side;

the MSC at the called side transmitting the received local reference to a BSS at the called side; and a BSS judging whether local switch can be triggered according to the received local reference, and executing the local switch when determining that the local switch can be triggered.

Furthermore, in the above method, the MSC at the calling side transmits the local reference to the BSS at the calling side and the MSC at the called side only when the calling user satisfies local switch conditions.

Furthermore, in the above method, satisfying the local switch conditions is that a user is currently not in a communication session with other users and meets a local switch user management strategy of an operator.

Furthermore, in the above method, the local reference is an identifier of an associated call allocated by the MSC at the calling side for this call, and the allocated local references are different for different calls, wherein an allocation way of the local reference comprises:

the MSC at the calling side allocating the local reference according to a calling number and a called number in the call; or the MSC at the calling side allocating the local reference according to a circuit number or a call identifier between the BSS at the calling side and the MSC at the calling side.

Furthermore, in the above method, the MSC at the calling side and the MSC at the called side are a same MSC or different MSCs;

the step of the MSC at the calling side transmitting the local reference to BSS at the calling side comprises:

the MSC at the calling side transmitting the local reference to the BSS at the calling side through a ground circuit assignment message, or transmitting the local reference to the calling side BSS through an independent notification message;

when the MSC at the calling side and the MSC at the called side are different MSCs, the step of the MSC at the calling side transmitting the local reference to the MSC at the called side comprises:

the MSC at the calling side transmitting the local reference to the MSC at the called side through an address initiation message, or transmitting the local reference to the MSC at the called side through an independent notification message.

Furthermore, in the above method, when the MSC at the calling side allocates the local reference according to the calling number and the called number, the step of the calling side MSC transmitting the local reference to the called side MSC through the address initiation message comprises:

the MSC at the calling side including the calling number and the called number in the address initiation message, and the MSC at the called side acquiring the local reference according to the calling number and the called number included in the address initiation message.

Furthermore, in the above method, before the step of the MSC at the called side transmitting the received local reference to the BSS at the called side, the method further comprises:

the MSC at the called side receiving the call establishment request of the MSC at the calling side, and judging whether a called user satisfies local switch conditions; wherein satisfying the local switch conditions is that a user is currently not in a communication session with other users, and meets a local switch user management strategy of an operator; and the MSC at the called side transmitting the received local reference to the BSS at the called side only when determining that the called user satisfies the local switch conditions.

Furthermore, in the above method, the step of the MSC at the called side transmitting the received local reference to the BSS at the called side comprises:

the MSC at the called side transmitting the received local reference to the BSS at the called side through a ground circuit assignment message, or transmitting the received local reference to the BSS at the called side through an independent notification message.

Furthermore, in the above method, in the step of the BSS judging whether the local switch can be triggered according to the received local reference.

the BSS is the BSS at the calling side or the BSS at the called side;

the step of the BSS judging whether the local switch can be triggered according to the received local reference comprises:

the BSS perceiving and confirming that two equal local references are received, and the BSS judging whether the calling user and a called user satisfy the local switch conditions; and if the BSS confirms that there are two equal local references, that is, the BSS at the calling side and the BSS at the called side are a same BSS, and if both the calling user and the called user satisfy the local switch conditions, then the BSS determining that the local switch can be triggered.

Furthermore, in the above method, the step of the BSS perceiving and confirming that two equal local references are received comprises:

after receiving the local reference transmitted by the MSC at the called side, the BSS searching whether there is a same local reference in a data area of the BSS or in a corresponding data list according to the local reference transmitted by the MSC at the called side.

Furthermore, in the above method, after the step of the BSS executing the local switch, the method further comprises:

the BSS returns an execution result to the MSC at the calling side and the MSC at the called side.

Furthermore, in the above method, in the step of the BSS executing the local switch, the BSS executes the local switch after receiving a called reply message of the called user; or the BSS executes the local switch after receiving a local switch notification message of the MSC at the calling side or the MSC at the called side; or the BSS determines that the calling user and the called user satisfy the local switch conditions and the BSS directly executes the local switch.

Furthermore, in the above method, before the step of the BSS executing the local switch, the method further comprises:

the MSC at the calling side or the MSC at the called side receiving a local switch request sent by the BSS and sending the local switch notification message to the BSS; or the MSC at the calling side or the MSC at the called side receiving the called reply message of the called user and sending the local switch notification message to the BSS.

Furthermore, in the above method, in the step of the BSS returning the execution result to the MSC at the calling side and the MSC at the called side, if the BSS executing the local switch succeeds, the execution result returned to the MSC at the calling side and to the MSC at the called side by the BSS is a local switch success message; or if the BSS executing the local switch fails, the execution result returned to the MSC at the calling side and to the MSC at the called side by the BSS is a local switch failure message.

Furthermore, in the above method, after the step of the BSS returning the execution result to the MSC at the calling side and the MSC at the called side, the method further comprises:

if the MSC at the calling side and the MSC at the called side receive the local switch success message sent by the BSS, releasing bearers between the BSS and the MSC at the calling side and between the BSS and the MSC at the called side; or if the MSC at the calling side and the MSC at the called side receive the local switch failure message sent by the BSS, keeping bearers between the BSS and the MSC at the calling side and between the BSS and the MSC at the called side.

Furthermore, in the above method, the step of the BSS returning the execution result to the MSC at the calling side and the MSC at the called side if the MSC at the calling side and the MSC at the called side are different MSCs comprises:

the BSS directly transmitting the execution result to the MSC at the calling side and the MSC at the called side respectively; or the BSS transmitting the execution result to one side of the MSC at the calling side and the MSC at the called side, and then the MSC which receives the execution result transmitting the execution result to another side of the MSC at the calling side and the MSC at the called side.

The present invention further provides a system for implementing local call local switch, and the system comprises a mobile switching center (MSC) and a base station system (BSS), wherein, the MSC comprises:

a MSC calling processing module, which is configured to: receive a call establishment request of a calling user and transmit a local reference of an associated call to a BSS at a calling side BSS and a MSC at a called side; and a MSC called processing module, which is configured to receive a local reference of an associated call and transmit the received local reference to a BSS at the called side;

the BSS comprises:

a BSS calling processing module, which is configured to: receive and store the local reference transmitted by the MSC at the calling side; and a BSS called processing module, which is configured to: receive the local reference transmitted by the MSC at the called side, judge whether local switch can be triggered according to the received local reference, and execute the local switch when determining that the local switch can be triggered.

Furthermore, in the above system, the MSC calling processing module is further configured to: judge whether the calling user satisfies local switch conditions;

the MSC called processing module is further configured to: judge whether a called user satisfies the local switch conditions;

when the calling user and the called user satisfy the local switch conditions respectively, the MSC calling processing module and the MSC called processing module transmit the local reference to the BSS at the calling side and the BSS at the called side respectively, wherein satisfying the local switch conditions is that a user is currently not in a communication session with other users and meets a local switch user management strategy of an operator.

Furthermore, in the above system, the local reference is an identifier of the associated call allocated by the MSC calling processing module for this call;

the MSC calling processing module is further configured to:

allocate the local reference according to a calling number and a called number in the call; or allocate the local reference according to a circuit number or a call identifier between the BSS at the calling side and the MSC at the calling side.

Furthermore, in the above system, when the MSC at the calling side and the MSC at the called side of the call are a same MSC, the MSC calling processing module transmits the local reference to the BSS at the calling side through an initiation message or an independent notification message; and when the MSC at the calling side and the MSC at the called side of the call are different, the MSC calling processing module transmits the local reference to the MSC at the called side through the initiation message or the independent notification message; when the MSC at the calling side and the MSC at the called side of the call are same, the MSC calling processing module transmits the local reference to the MSC called processing module of this MSC.

Furthermore, in the above system, the BSS called processing module is further configured to:

search whether there is a same local reference in a data area of the BSS or in a corresponding data list according to the local reference after receiving the local reference transmitted by the MSC at the called side; and judge whether the calling user and the called user satisfy the local switch conditions; and determine that the local switch can be triggered if there are two equal local references and the calling user and the called user satisfy the local switch conditions.

Furthermore, in the above system, the BSS calling processing module is further configured to: send a local switch request to the MSC at the calling side and receive a local switch notification message sent by the MSC at the calling side; or the BSS called processing module is further configured to: send a local switch request to the MSC at the called side and receive a local switch notification message sent by the MSC at called side; and the MSC calling processing module is further configured to: receive the local switch request sent by the BSS at the calling side, or receive a called reply message of a called user, and send the local switch notification message to the BSS at the calling side; or the MSC called processing module is further configured to: receive the local switch request sent by the BSS at the called side, and send the local switch notification message to the BSS at the called side.

Furthermore, in the above system, after completing executing the local switch, the BSS calling processing module is further configured to: return an execution result to the MSC at the calling side;

the BSS called processing module is further configured to: return an execution result to the MSC at the called side; wherein, if executing the local switch succeeds, the returned execution result is a local switch success message;

if the executing the local switch fails, the returned execution result is a local switch failure message.

Furthermore, in the above system, the MSC calling processing module is further configured to: receive the execution result returned by the BSS at the calling side; and release a bearer with the BSS at the calling side when the execution result is the local switch success message; or keep the bearer with the BSS at the calling side when the execution result is the local switch failure message;

the MSC called processing module is further configured to: receive the execution result returned by BSS at the called side BSS; and release the bearer with the BSS at the called side when the execution result is the local switch success message; or keep the bearer with the BSS at the called side when the execution result is the local switch failure message.

Furthermore, in the above system, when the MSC at the calling side and the MSC at the called side are a same MSC, the MSC calling processing module is further configured to: transmit the execution result to the MSC called processing module after receiving the execution result returned by the BSS at the calling side; and the MSC called processing module is further configured to: receive the execution result transmitted by the MSC calling processing module;

or when the MSC at the calling side and the MSC at the called side are different, the MSC calling processing module is further configured to: transmit the execution result to the MSC at the calling side after receiving the execution result returned by the BSS at the called side; and the MSC called processing module is further configured to: receive the execution result transmitted by the MSC at the calling side.

PREFERRED EMBODIMENTS OF THE PRESENT INVENTION

The present invention is further described in detail with reference to the accompanying drawings in combination with embodiments hereinafter.

Figure 1:
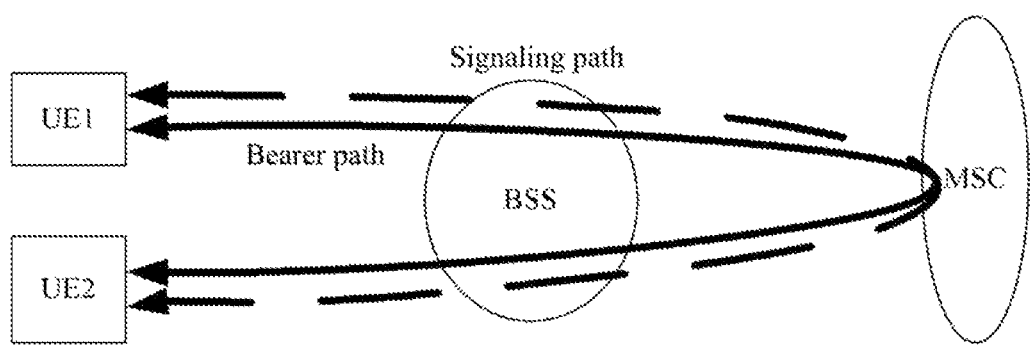
FIG. 1 is a schematic diagram of a traditional voice call.
Figure 2:
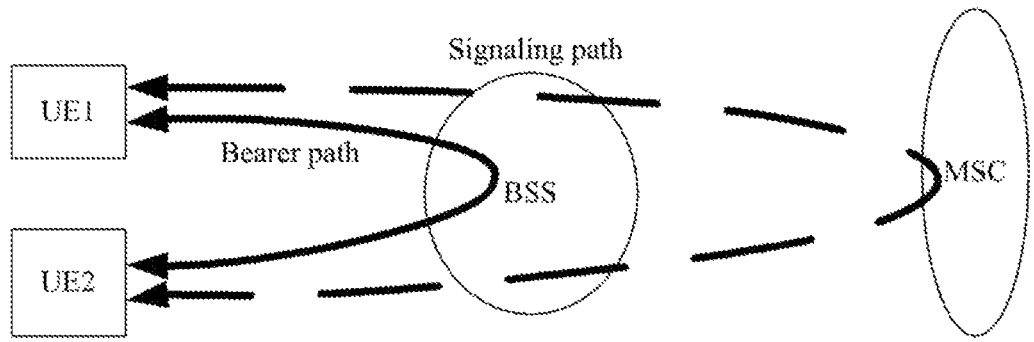
FIG. 2 is a schematic diagram of a voice call using local call local switch technology.
Figure 3:
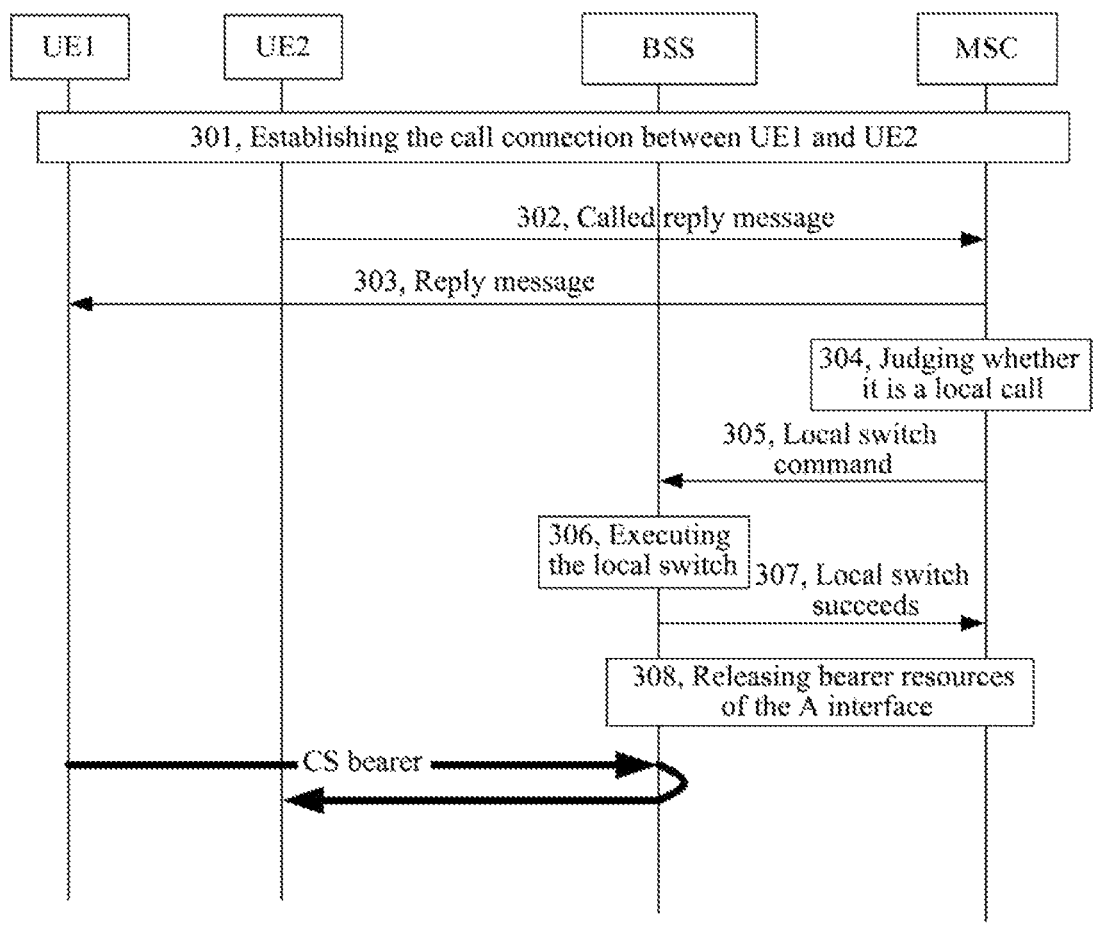
FIG. 3 is a flow chart of signaling using local call local switch technology of FIG. 2.
Figure 4:
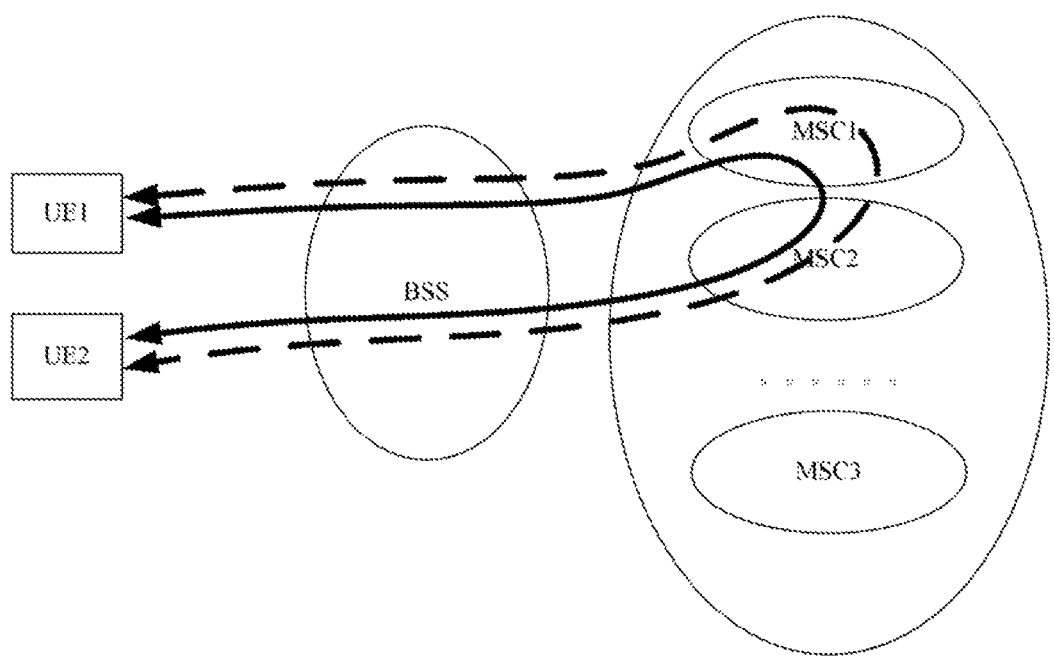
FIG. 4 is a schematic diagram of a scenario of the BSS connecting multiple MSCs.
Figure 5:
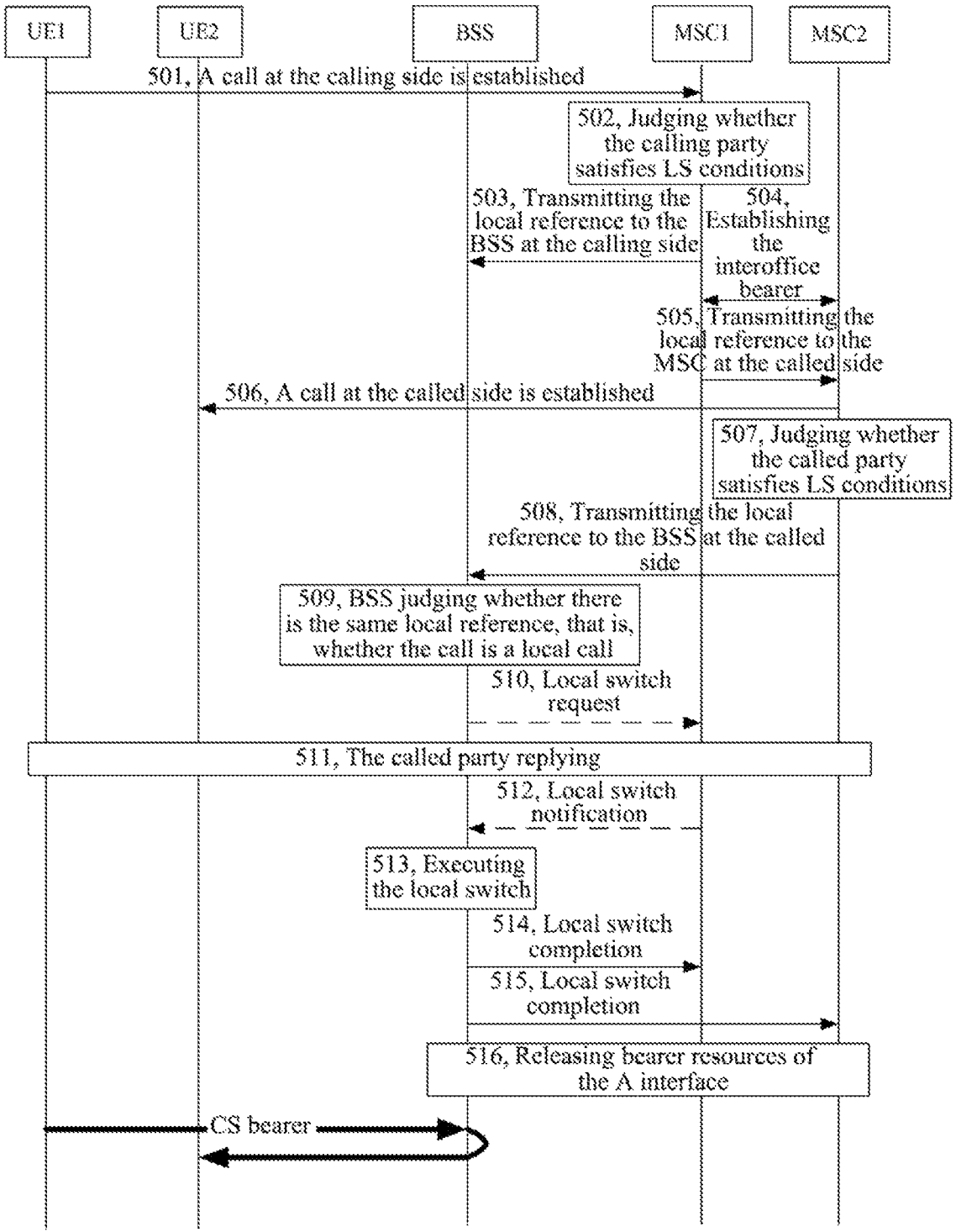
FIG. 5 is a flow chart of executing the local switch in a scenario of a calling user and a called user being located in the same BSS but belonging to different MSCs according to an embodiment of the present invention.

FIG. 5 is a flow chart of executing the local switch in a scenario of a calling user and a called user being located in the same BSS but belonging to different MSCs according to an embodiment of the present invention. In this embodiment, the UE1 and the UE2 are in the same BSS, the UE1 accesses the MSC1 through the BSS, and the UE2 accesses the MSC2 through the BSS. The UE1 calls the UE2; the local reference of the BSS associates the call between the BSS and the UE1 with the call between the BSS and the UE2, and executes the local switch. As shown in FIG. 5, this embodiment comprises the following steps:

501, the UE1 initiates the call establishment request to the MSC1 through the BSS, and the called party in the request message is the UE2;

502, the MSC1 judges whether the UE1 is currently in a communication session with other users, whether a local switch user management strategy of an operator is met, and whether a monitoring point, that is, the monitoring service of the MSC is set; if the UE1 satisfies that the UE 1 is currently not in a communication session with other users, meets the local switch user management strategy of the operator and does not set the monitoring point, that is the monitoring service of the MSC1, or if the UE1 at least satisfies that the UE1 is currently not in a communication session with other users and meets the local switch user management strategy of the operator, then the local switch conditions are satisfied;

503, if it is determined that the UE1 satisfies the local switch conditions in step 502, then the MSC1 allocates the local reference, in which the allocation way can use the following ways:

(1) the MSC1 allocates the local references according to a calling number and a called number in the call;

(2) the MSC1 allocates the local references according to circuit numbers or call identifiers between the BSS and the MSC;

wherein the allocated local reference is an identifier related to the call, and the identifier can be a number of an associated call or other related call identifiers;

the MSC1 carries the allocated local reference in a ground circuit assignment message to the BSS at the calling side, or transmits the allocated local reference to the BSS at the calling side through an independent notification message;

504, the MSC1 establishes an interoffice bearer with the MSC2 according to the called number of the called UE2 or the roaming called number of the user acquired from the home subscriber server of the UE2, and sends an establishment interoffice bearer message including the called number to the MSC2;

505, if it is determined that the UE1 satisfies the local switch conditions in step 502, then the MSC1 transmits the local reference to the MSC2, in which the transmitting way can use the following ways:

the MSC1 transmits the local reference to the MSC2 at the called side through an address initiation message, wherein when the MSC1 allocates the local reference according to the calling number and the called number, the calling number and the called number can be included in the call reference field (Call Reference) in the address initiation message or other fields in the address initiation message, and the MSC2 can acquire the local reference according to the calling number and the called number included in the address initiation message; or the MSC1 transmits the local reference to the MSC2 through an independent notification message.

506, the MSC2 receives the establishment interoffice bearer message sent by the MSC1 in step 504, and then the MSC2 sends the establishment call request according to the called number in the address initiation message, or according to the called number acquired from the roaming number, or according to the called number carried in the establishment interoffice bearer message;

507, the MSC2 judges whether the UE2 is currently in a communication session with other users, whether the local switch user management strategy of the operator is met, and whether the monitoring point, that is, the monitoring service of the MSC is set; if the UE2 is currently not in a communication session with other users, meets the local switch user management strategy of the operator and does not set the monitoring point, that is, the monitoring service of the MSC2, then the local switch conditions are satisfied.

508, if it is determined that the UE2 satisfies the local switch conditions in step 507, then the MSC2 transmits the local reference acquired from the MSC1 to the BSS, in which transmitting the local reference can use the following ways:

the MSC2 transmits the local reference to the BSS at the called side through the ground circuit assignment message or through an independent notification message;

509, the BSS perceives that two equal local references are received and judges whether the UE1 and the UE2 meet the conditions for triggering the local switch. The BSS perceives the two equal local references by using the following ways:

the BSS receives the local reference sent by the MSC2 at the called side, and the BSS searches whether there is the same local reference in the BSS data field or in the corresponding data list according to the local reference. That is, when the same local reference exists, it can be determined that the BSS at the calling side and the BSS at the called side are the same BSS.

If the local reference is allocated by the allocation way (2) in step 503, then the BSS acquires the circuit or call identifier information at the calling side according to the local reference, and judges whether the BSS at the calling side and the BSS at the called side are the same BSS; if the same, then directly searches the data area at the calling side according to the local reference to check whether there is the same local reference.

510, the BSS associates the calls to the UE1 and the UE2 according to the local reference, and if the BSS determines that the call between the UE1 and the UE2 is a local call and the local switch service can be triggered, then the BSS sends the local switch request message to the MSC1 or the MSC2;

511, the called party replies;

512, the MSC1 or the MSC2 sends a local switch notification message to the BSS to notify the BSS to execute the local switch;

513, the BSS receives the local switch notification message of the MSC1 or the MSC2, executes the local switch, and loops the UE1 and the UE2 to the voice bearer connection of the BSS;

514, the BSS sends a local switch success message to the MSC1 after the local switch succeeding to notify the MSC1 that this local switch has already succeeded;

515, the BSS sends a local switch success message to the MSC2 after the local switch succeeding to notify the MSC2 that the local switch at this time has already succeeded;

516, the MSC1 and the MSC2 release the ground bearer circuits connected to the BSS, that is, release the bearer resources of the A interface.

In other embodiments, step 510 is an optional step: the BSS can select not to send the local switch request message; and if the BSS determines that the triggering local switch conditions are satisfied, then the BSS executes the local switch directly.

In other embodiments, step 512 is an optional step; and if step 510 is not selected, that is, the BSS does not send the local switch request message, then this step 512 can be not selected.

In other embodiments, when step 510 and step 512 are not selected, the step 513 is that:

513, the BSS determines that the UE1 and the UE2 satisfy the local switch conditions, executes the local switch directly, and loops the UE1 and the UE2 to the voice bearer connection of the BSS. In other embodiments, in steps 514-515, the BSS can also only send the local switch completion message to the MSC at one side, and the MSC notifies the MSC at the other side after receiving the local switch completion message.

Figure 6:
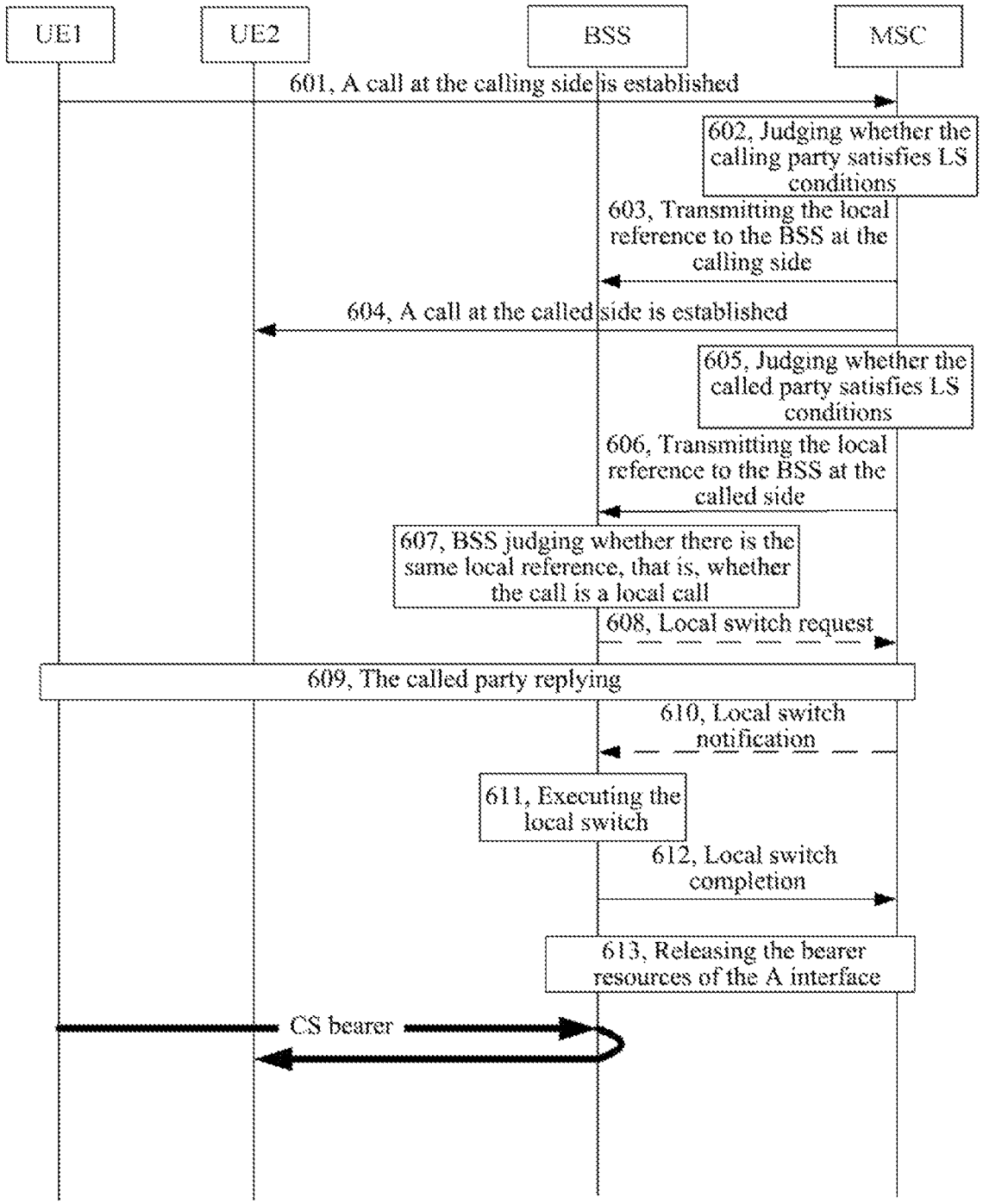
FIG. 6 is a flow chart of executing the local switch in a scenario of a calling user and a called user being located in the same BSS and the same MSC according to an embodiment of the present invention.

FIG. 6 is a flow chart of executing the local switch in a scenario of a calling user and a called user being located in the same BSS and the same MSC; as shown in FIG. 6, following steps are comprised:

steps 601-603 are the same with the above steps 501-503, and will not be repeatedly illustrated herein;

604, the MSC sends the called establishment call request to the UE2 according to the called number in the message;

605, the MSC judges whether the UE2 is currently in a communication session with other users, whether the local switch user management strategy of the operator is met, and whether the monitoring point, that is, the monitoring service of the MSC, is set; and if the UE2 is currently not in a communication session with other users, the local switch user management strategy of the operator is met and the monitoring point, that is, the monitoring service of the MSC2, is not set, then the local switch conditions are satisfied;

606, if step 605 determines that the UE2 satisfies the local switch conditions, then the MSC transmits the local reference to the BSS at the called side; and transmitting the local reference can use the following ways:

the MSC include the local reference in the ground circuit assignment message to the called side BSS, or transmits the local reference to the called side BSS through an independent notification message;

607, the BSS perceives that two equal local references are received and judges whether the users UE1 and the UE2 meet the conditions for triggering the local switch. The BSS perceives the two equal local references by using the following ways:

the BSS receives the local reference sent by the MSC at the called side, and the BSS searches whether there is the same local reference in the data area of the BSS or in the corresponding data list according to the local reference.

If the local reference is allocated by the allocation way (2) in step 603, then the BSS acquires the circuit or call identifier information at the calling side according to the local reference, and judges whether the BSS at the calling side and the BSS at the called side are the same BSS; if the same, then directly searches in the data area at the calling side according to the local reference to check whether there is the same local reference.

608, the BSS associates the calls to the UE1 and the UE2 according to the local reference, and if the BSS determines that the call between the UE1 and the UE2 is a local call and the local switch service can be triggered, then the BSS sends the local switch request message to the MSC;

609, the called party replies;

610, the MSC sends the local switch notification message to the BSS to notify the BSS to execute the local switch;

611, the BSS receives the local switch notification message, executes the local switch, and loops the UE1 and the UE2 to the voice bearer connection of the BSS;

612, the BSS sends a local switch success message to the MSC after the local switch succeeding to notify the MSC that the local switch at this time has already succeeded; and

613, the MSC releases the ground bearer circuit connected to the BSS, that is, release the bearer resource of the A interface.

In other embodiments, step 608 is an optional step; the BSS can select not to send the local switch request message; and if the BSS determines that the triggering local switch conditions are satisfied, then the BSS executes the local switch directly.

In other embodiments, step 610 is an optional step; and if step 608 is not selected, that is, the BSS does not send the local switch request message, then this step 610 can be not selected.

In other embodiments, when step 608 and step 610 are not selected, step 611 can be that:

611, the BSS determines that the UE1 and the UE2 satisfy the local switch conditions, executes the local switch directly, and loops the UE1 and the UE2 to the voice bearer connection of the BSS.

Figure 7:
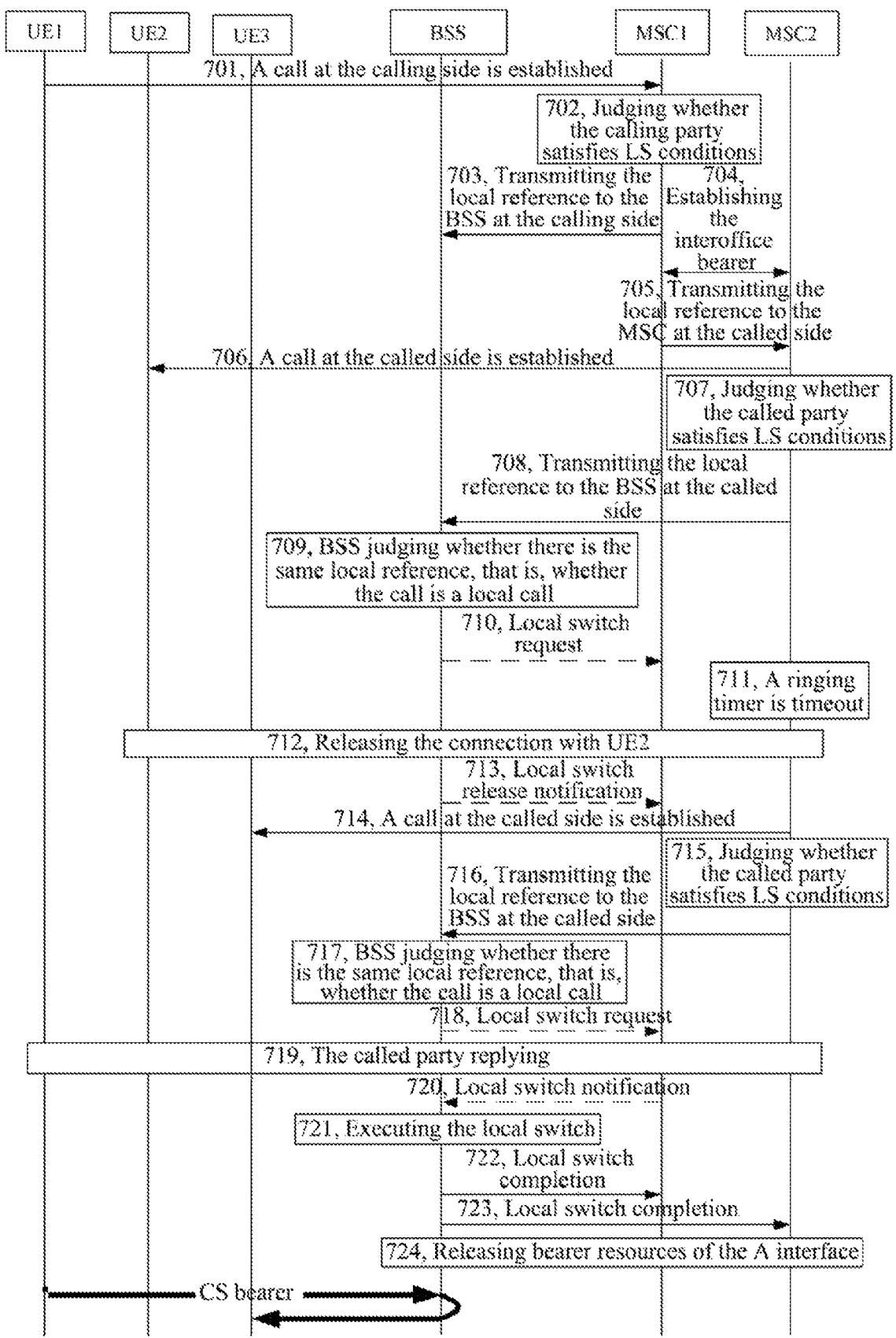
FIG. 7 is a flow chart of an embodiment that a called user subscribes the forwarding no reply to another user according to the present invention.

FIG. 7 is a flow chart of an embodiment that a called user subscribes the forwarding no reply to another user, wherein the calling user UE1 calls the called user UE2 and the called user UE2 has subscribed the forwarding no reply to the UE3. The UE1, UE2 and UE3 are in the same BSS; the UE1 accesses the MSC1 through the BSS, and the UE2 and UE3 accesses the MSC2 through the BSS. The UE1 calls the UE2, and the BSS local reference associates the call between the BSS and the UE1 with the call between the BSS and the UE2. The UE2 performs forwarding no reply to the UE3, and the BSS associates the UE1 and the UE3 again according to the local reference and executes the local switch. As shown in FIG. 7, the embodiment comprises the following steps:

steps 701-710 are the same as the above steps 501-510, and will not be repeatedly illustrated herein;

711, the UE2 ringing is timeout, and UE2 has subscribed forwarding the call service to the UE3 before no reply;

712, the MSC2 releases the connection with the UE2;

713, the BSS sends a local switch release message to the MSC1 after completing the release;

714, the MSC2 sends the called establishment call request to the UE3;

steps 715-724 are the same as the above steps 507-516, and will not be repeatedly illustrated herein.

Figure 8:
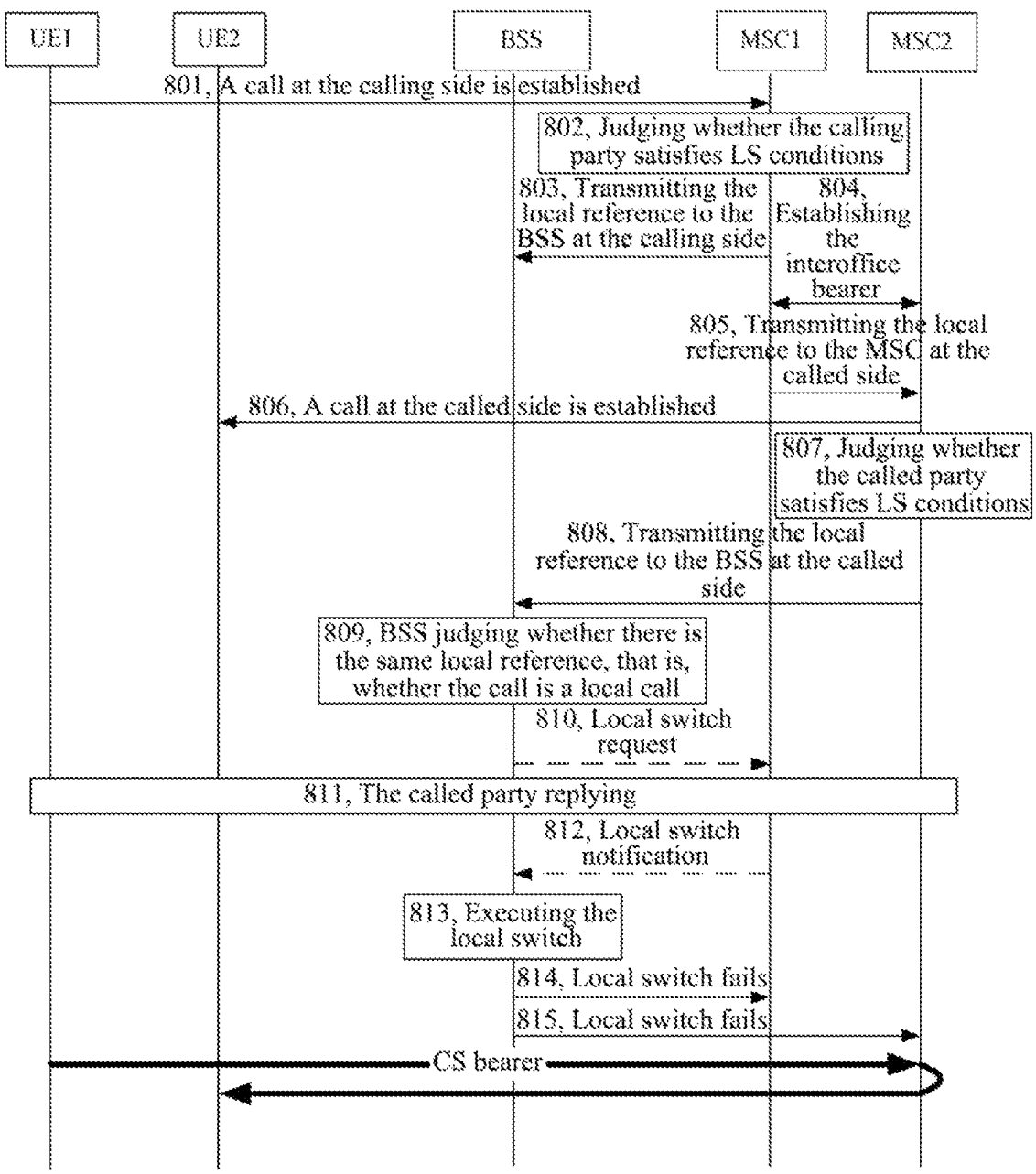
FIG. 8 is a flow chart of a failed local switch in a scenario of a calling user and a called user being located in the same BSS but belonging to different MSCs according to an embodiment of the present invention.

FIG. 8 is a flow chart of a failed local switch in a scenario of a calling user and a called user being located in the same BSS but belonging to different MSCs according to an embodiment; as shown in FIG. 8, the embodiment includes the following steps:

steps 801-813 are the same with the above steps 501-513, and will not be repeatedly illustrated herein;

814-815, the BSS executes the local switch, but the local switch fails possibly due to the resource problem. The BSS sends a local switch failure message to the MSC1 and the MSC2 respectively to notify the MSC1 and the MSC2 that the local switch at this time has already failed, and the MSC1 and the MSC2 will keep the bearer ground circuit with the BSS.

In other embodiments, in steps 814-815, the BSS can also send the local switch failure message to the MSC at one side, and the MSC notifies the MSC at another side after receiving the local switch failure message.

Figure 9:
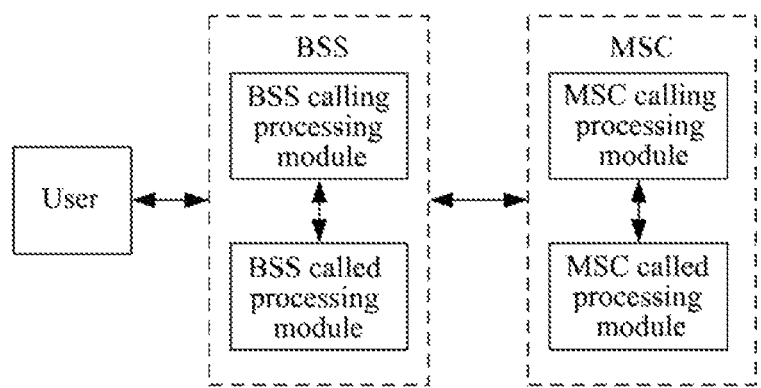
FIG. 9 is a schematic diagram of a system for implementing local call local switch according to the present invention.

FIG. 9 is a schematic diagram of the system for implementing local call local switch according to the present invention, and the system comprises a MSC and a BSS, wherein the MSC and the BSS are in communication connection; the MSC can act as a MSC at a calling side or a MSC at a called side, which is connected to the BSS at the calling side or the BSS at the called side respectively.

The MSC can comprise a MSC calling processing module and a MSC called processing module, wherein the MSC calling processing module is configured to: receive a call establishment request of a calling user and transmit a local reference of an associated call to the BSS at the calling side and the BSS at the called side; and the MSC called processing module is configured to: receive a local reference of the associated call and transmit the received local reference to the BSS at the called side;

the BSS can comprise a BSS calling processing module and a BSS called processing module, wherein the BSS calling processing module is configured to: receive and store the local reference transmitted by the MSC at the calling side; and the BSS called processing module is configured to: receive the local reference transmitted by the MSC at the called side, judge whether a local switch can be triggered according to the received local reference, and execute the local switch when determining that the local switch can be triggered.

Furthermore, the MSC calling processing module and the MSC called processing module are further configured to judge whether the calling user and the called user satisfy the local switch conditions respectively;

the MSC calling processing module and the MSC called processing module transmit the local references to the BSS at the calling side and the BSS at the called side respectively only when the calling user and the called user satisfy the local switch conditions respectively, wherein satisfying the local switch conditions is that the user is currently not in a communication session with other users and meets a local switch user management strategy of an operator.

Furthermore, the local reference is an identifier of the associated call allocated by the MSC calling processing module for this call; the MSC calling processing module is further configured to: allocate the local reference according to a calling number and a called number in the call; or allocate the local reference according to a circuit number or a call identifier between the BSS at the calling side and the MSC at the calling side.

Furthermore, when the MSC at the calling side and the called side MSC of the call are the same MSC, the MSC calling processing module transmits the local reference to the BSS at the calling side through an initiation message or an independent notification message; and when the MSC at the calling side and the MSC at the called side of the call are different, the MSC calling processing module transmits the local reference to the MSC at the called side through the initiation message or the independent notification message; when the MSC at the calling side and the MSC at the called side of the call are the same, the MSC calling processing module transmits the local reference to the MSC called processing module of the present MSC.

Furthermore, the BSS called processing module is further configured to: search whether there is the same local reference in the data area of the BSS or in the corresponding data list according to the local reference after receiving the local reference transmitted by the MSC at the called side; and judge whether the calling user and the called user satisfy the local switch conditions;

if two equal local references exist, that is, the BSS at the calling side and the BSS at the called side are the same BSS, in other words, the call is a local call, and the calling user and the called user satisfy the local switch conditions, then the BSS processing called module determines that the local switch can be triggered.

Furthermore, the BSS calling processing module is further configured to: send the local switch request to the MSC at the calling side and receive a local switch notification message sent by the MSC at the calling side; or the BSS called processing module is further configured to: send the local switch request to the MSC at the called side and receive the local switch notification message sent by the MSC at the called side; and the MSC calling processing module is further configured to: receive the local switch request sent by the BSS at the calling side, or receive a called reply message of the called user, and send the local switch notification message to the BSS at the calling side; or the MSC called processing module is further configured to: receive the local switch request sent by the BSS at the called side, and send the local switch notification message to the BSS at the called side.

Furthermore, after completing executing the local switch, the BSS calling processing module is further configured to: return an execution result to the MSC at the calling side; the BSS called processing module is further configured to: return the execution result to the MSC at the called side; wherein, if executing the local switch succeeds, the returned execution result is a local switch success message;

if executing the local switch fails, the returned execution result is a local switch failure message.

Furthermore, the MSC calling processing module is further configured to: receive the execution result returned by the BSS at the calling side; and release a bearer with the BSS at the calling side when the execution result is the local switch success message; or keep the bearer with the BSS at the calling side when the execution result is the local switch failure message;

the MSC called processing module is further configured to: receive the execution result returned by the BSS at the called side; and release the bearer with the BSS at the called side when the execution result is the local switch success message; or keep the bearer with the BSS at the called side when the execution result is the local switch failure message.

Furthermore, when the MSC at the calling side and the MSC at the called side are the same MSC, the MSC calling processing module is further configured to: transmit the execution result to the MSC called processing module after receiving the execution result returned by the BSS at the calling side; and the MSC called processing module is further configured to: receive the execution result transmitted by the MSC calling processing module; or when the MSC at the calling side and the MSC at the called side are different, the MSC calling processing module is further configured to: transmit the execution result to the MSC at the calling side after receiving the execution result returned by the BSS at the called side; and the MSC called processing module is further configured to: receive the execution result transmitted by the MSC at the calling side.

Certainly, the present invention can also have a variety of other embodiments. Those skilled in the art can make various corresponding modifications and variations to the present invention without departing from the spirit and essence of the present invention. And all of these modifications and variations should fall into in the protection scope of the appended claims of the present invention.

INDUSTRIAL APPLICABILITY

The method and the system for implementing local call local switch provided by the present invention solved the problem of unsuccessful local switch resulted by the BSS connecting multiple MSCs.

What is claimed is:

1. A method for implementing local call local switch comprising:
  a mobile switching center (MSC) at a calling side receiving a call establishment request of a calling user, and the MSC at the calling side transmitting a local reference of an associated call to a base station system (BSS) at the calling side and a MSC at a called side;
  the MSC at the called side transmitting the received local reference to a BSS at the called side;
  a BSS judging whether local switch can be triggered according to the received local reference, and executing the local switch when determining that the local switch can be triggered;
  wherein
  when the MSC at the calling side and the MSC at the called side are the same MSC, the step of the MSC at the calling side transmitting the local reference to BSS at the calling side comprises:
    the MSC at the calling side transmitting the local reference to the BSS at the calling side through a ground circuit assignment message, or transmitting the local reference to the calling side BSS through an independent notification message; and
  when the MSC at the calling side and the MSC at the called side are different MSCs, the step of the MSC at the calling side transmitting the local reference to the MSC at the called side comprises:
    the MSC at the calling side transmitting the local reference to the MSC at the called side through an address initiation message, or transmitting the local reference to the MSC at the called side through an independent notification message.

2. The method according to claim 1, wherein the MSC at the calling side transmits the local reference to the BSS at the calling side and the MSC at the called side only when the calling user satisfies local switch conditions.

3. The method according to claim 2, wherein satisfying the local switch conditions is that a user is currently not in a communication session with other users and meets a local switch user management strategy of an operator.

4. The method according to claim 1, wherein the local reference is an identifier of an associated call allocated by the MSC at the calling side for this call, and the allocated local references are different for different calls, wherein an allocation way of the local reference comprises:
  the MSC at the calling side allocating the local reference according to a calling number and a called number in the call; or
  the MSC at the calling side allocating the local reference according to a circuit number or a call identifier between the BSS at the calling side and the MSC at the calling side.

5. The method according to claim 1, wherein when the MSC at the calling side allocates the local reference according to the calling number and the called number, the step of the calling side MSC transmitting the local reference to the called side MSC through the address initiation message comprises:
  the MSC at the calling side including the calling number and the called number in the address initiation message, and the MSC at the called side acquiring the local reference according to the calling number and the called number included in the address initiation message.

6. The method according to claim 1, before the step of the MSC at the called side transmitting the received local reference to the BSS at the called side, the method further comprising:
  the MSC at the called side receiving the call establishment request of the MSC at the calling side, and judging whether a called user satisfies local switch conditions; wherein
  satisfying the local switch conditions is that a user is currently not in a communication session with other users, and meets a local switch user management strategy of an operator; and
  the MSC at the called side transmitting the received local reference to the BSS at the called side only when determining that the called user satisfies the local switch conditions.

7. The method according to claim 6, wherein the step of the MSC at the called side transmitting the received local reference to the BSS at the called side comprises:
  the MSC at the called side transmitting the received local reference to the BSS at the called side through a ground circuit assignment message, or transmitting the received local reference to the BSS at the called side through an independent notification message.

8. The method according to claim 1, wherein
  in the step of the BSS judging whether the local switch can be triggered according to the received local reference,
  the BSS is the BSS at the calling side or the BSS at the called side;

the step of the BSS judging whether the local switch can be triggered according to the received local reference comprises:
the BSS perceiving and confirming that two equal local references are received, and the BSS judging whether the calling user and a called user satisfy the local switch conditions; and
if the BSS confirms that there are two equal local references, that is, the BSS at the calling side and the BSS at the called side are a same BSS, and if both the calling user and the called user satisfy the local switch conditions, then the BSS determining that the local switch can be triggered.

9. The method according to claim 8, wherein the step of the BSS perceiving and confirming that two equal local references are received comprises:
after receiving the local reference transmitted by the MSC at the called side, the BSS searching whether there is a same local reference in a data area of the BSS or in a corresponding data list according to the local reference transmitted by the MSC at the called side.

10. The method according to claim 8, after the step of the BSS executing the local switch, the method further comprising:
the BSS returns an execution result to the MSC at the calling side and the MSC at the called side.

11. The method according to claim 8, wherein in the step of the BSS executing the local switch,
the BSS executes the local switch after receiving a called reply message of the called user; or
the BSS executes the local switch after receiving a local switch notification message of the MSC at the calling side or the MSC at the called side; or
the BSS determines that the calling user and the called user satisfy the local switch conditions and the BSS directly executes the local switch.

12. The method according to claim 11, before the step of the BSS executing the local switch, the method further comprising:
the MSC at the calling side or the MSC at the called side receiving a local switch request sent by the BSS and sending the local switch notification message to the BSS; or
the MSC at the calling side or the MSC at the called side receiving the called reply message of the called user and sending the local switch notification message to the BSS.

13. The method according to claim 10, wherein in the step of the BSS returning the execution result to the MSC at the calling side and the MSC at the called side,
if the BSS executing the local switch succeeds, the execution result returned to the MSC at the calling side and to the MSC at the called side by the BSS is a local switch success message; or
if the BSS executing the local switch fails, the execution result returned to the MSC at the calling side and to the MSC at the called side by the BSS is a local switch failure message.

14. The method according to claim 13, after the step of the BSS returning the execution result to the MSC at the calling side and the MSC at the called side, the method further comprising:
if the MSC at the calling side and the MSC at the called side receive the local switch success message sent by the BSS, releasing bearers between the BSS and the MSC at the calling side and between the BSS and the MSC at the called side; or
if the MSC at the calling side and the MSC at the called side receive the local switch failure message sent by the BSS, keeping bearers between the BSS and the MSC at the calling side and between the BSS and the MSC at the called side.

15. The method according to claim 10, wherein the step of the BSS returning the execution result to the MSC at the calling side and the MSC at the called side if the MSC at the calling side and the MSC at the called side are different MSCs comprises:
the BSS directly transmitting the execution result to the MSC at the calling side and the MSC at the called side respectively; or
the BSS transmitting the execution result to one side of the MSC at the calling side and the MSC at the called side, and then the MSC which receives the execution result transmitting the execution result to another side of the MSC at the calling side and the MSC at the called side.

16. A system for implementing local call local switch comprising a mobile switching center (MSC) and a base station system (BSS), wherein,
the MSC comprises:
a MSC calling processing module, which is configured to: receive a call establishment request of a calling user and transmit a local reference of an associated call to a BSS at a calling side BSS and a MSC at a called side; and
a MSC called processing module, which is configured to receive a local reference of an associated call and transmit the received local reference to a BSS at the called side;
the BSS comprises:
a BSS calling processing module, which is configured to: receive and store the local reference transmitted by the MSC at the calling side; and
a BSS called processing module, which is configured to: receive the local reference transmitted by the MSC at the called side, judge whether local switch can be triggered according to the received local reference, and execute the local switch when determining that the local switch can be triggered; wherein
when the MSC at the calling side of the call and the MSC at the called side of the call are the same MSC, the MSC calling processing module transmits the local reference to the BSS at the calling side through an initiation message or an independent notification message; and
when the MSC at the calling side of the call and the MSC at the called side of the call are different MSCs, the MSC calling processing module transmits the local reference to the MSC at the called side through the initiation message or the independent notification message.

17. The system according to claim 16, wherein
the MSC calling processing module is further configured to: judge whether the calling user satisfies local switch conditions;
the MSC called processing module is further configured to: judge whether a called user satisfies the local switch conditions;
when the calling user and the called user satisfy the local switch conditions respectively, the MSC calling processing module and the MSC called processing module transmit the local reference to the BSS at the calling side and the BSS at the called side respectively, wherein
satisfying the local switch conditions is that a user is currently not in a communication session with other users and meets a local switch user management strategy of an operator.

18. The system according to claim 16, wherein the local reference is an identifier of the associated call allocated by the MSC calling processing module for this call;
- the MSC calling processing module is further configured to:
  - allocate the local reference according to a calling number and a called number in the call; or
  - allocate the local reference according to a circuit number or a call identifier between the BSS at the calling side and the MSC at the calling side.

19. The system according to claim 16, wherein the BSS called processing module is further configured to:
- search whether there is a same local reference in a data area of the BSS or in a corresponding data list according to the local reference after receiving the local reference transmitted by the MSC at the called side; and
- judge whether the calling user and the called user satisfy the local switch conditions; and
- determine that the local switch can be triggered if there are two equal local references and the calling user and the called user satisfy the local switch conditions.

20. The system according to claim 16, wherein
- the BSS calling processing module is further configured to: send a local switch request to the MSC at the calling side and receive a local switch notification message sent by the MSC at the calling side; or
- the BSS called processing module is further configured to: send a local switch request to the MSC at the called side and receive a local switch notification message sent by the MSC at called side; and
- the MSC calling processing module is further configured to: receive the local switch request sent by the BSS at the calling side, or receive a called reply message of a called user, and send the local switch notification message to the BSS at the calling side; or
- the MSC called processing module is further configured to: receive the local switch request sent by the BSS at the called side, and send the local switch notification message to the BSS at the called side.

21. The system according to claim 16, wherein after completing executing the local switch,
- the BSS calling processing module is further configured to: return an execution result to the MSC at the calling side;
- the BSS called processing module is further configured to: return an execution result to the MSC at the called side; wherein,
- if executing the local switch succeeds, the returned execution result is a local switch success message;
- if the executing the local switch fails, the returned execution result is a local switch failure message.

22. The method according to claim 21, wherein
- the MSC calling processing module is further configured to: receive the execution result returned by the BSS at the calling side; and release a bearer with the BSS at the calling side when the execution result is the local switch success message; or keep the bearer with the BSS at the calling side when the execution result is the local switch failure message;
- the MSC called processing module is further configured to: receive the execution result returned by BSS at the called side BSS; and release the bearer with the BSS at the called side when the execution result is the local switch success message; or keep the bearer with the BSS at the called side when the execution result is the local switch failure message.

23. The method according to claim 21, wherein,
- when the MSC at the calling side and the MSC at the called side are a same MSC, the MSC calling processing module is further configured to: transmit the execution result to the MSC called processing module after receiving the execution result returned by the BSS at the calling side; and
- the MSC called processing module is further configured to: receive the execution result transmitted by the MSC calling processing module;

or
- when the MSC at the calling side and the MSC at the called side are different, the MSC calling processing module is further configured to: transmit the execution result to the MSC at the calling side after receiving the execution result returned by the BSS at the called side; and
- the MSC called processing module is further configured to: receive the execution result transmitted by the MSC at the calling side.

\* \* \* \* \*